(12) United States Patent
Ambri et al.

(10) Patent No.: US 6,908,600 B2
(45) Date of Patent: Jun. 21, 2005

(54) METHOD FOR OBTAINING PIGMENTS FOR CERAMIC AND GLASS, AND PIGMENTS OBTAINED THEREBY

(76) Inventors: Franco Ambri, Via Montegibbio, 33/A, 41049 Sassuolo (IT); Filippo Ranuzzi, Viale Montale, 22, 41049 Sassuolo (IT)

( * ) Notice: Subject to any disclaimer, the term of this patent is extended or adjusted under 35 U.S.C. 154(b) by 57 days.

(21) Appl. No.: 10/302,961

(22) Filed: Nov. 25, 2002

(65) Prior Publication Data

US 2003/0099588 A1 May 29, 2003

(30) Foreign Application Priority Data

Nov. 27, 2001 (IT) .................................... MO2001A0232

(51) Int. Cl.$^7$ .............................................. C01B 15/14
(52) U.S. Cl. ...................... 423/325; 423/335; 423/339; 423/604; 423/605; 423/607; 423/632; 423/633; 106/453; 106/456; 106/481; 106/482
(58) Field of Search ................................ 423/325, 335, 423/339, 604, 605, 607, 632, 633, 594.19; 106/453, 456, 481, 482

(56) References Cited

U.S. PATENT DOCUMENTS

| 4,251,394 | A | | 2/1981 | Carter et al. |
| 4,299,635 | A | * | 11/1981 | Dickerson |
| 4,404,254 | A | * | 9/1983 | Franz et al. ................. 428/329 |
| 5,931,998 | A | * | 8/1999 | Tourangeau ................. 106/414 |
| 6,228,160 | B1 | * | 5/2001 | Hanich et al. ............... 106/456 |
| 6,264,907 | B1 | * | 7/2001 | Matsuda et al. |
| 6,685,907 | B2 | * | 2/2004 | Matsuda et al. |

FOREIGN PATENT DOCUMENTS

| DE | 42 44 258 | | 6/1994 |
| EP | 0 947 564 | | 10/1999 |
| GB | 1103059 | * | 2/1968 |

* cited by examiner

*Primary Examiner*—Paul Marcantoni
(74) *Attorney, Agent, or Firm*—Guido Modiano; Albert Josif; Daniel O'Byrne

(57) ABSTRACT

A method for obtaining pigments for ceramic and glass, particularly for substrates and coatings, including a step of adding a solution of an iron salt to at least one silicon addition agent including silica in gel form.

38 Claims, No Drawings

METHOD FOR OBTAINING PIGMENTS FOR CERAMIC AND GLASS, AND PIGMENTS OBTAINED THEREBY

BACKGROUND OF THE INVENTION

The present invention relates to a method for obtaining pigments for ceramic and glass, particularly for substrates and coatings, and to the pigments obtained thereby.

In the field of production of ceramic and glass articles, such as for example tiles, kitchenware, sanitary fittings, furnishings and ornaments, gift items and the like, one of the steps of greatest technical and commercial interest is the coloring of the substrates, i.e., of the bodies of the articles, and of their coatings and decorations.

The search for new or alternative pigments and the development of existing ones is evolving constantly.

The essential requirements for a product to be usable as a ceramic/glass pigment are: thermal stability, i.e., resistance to the firing cycles to which the articles are subjected and which can reach temperatures on the order of 1400° C.; chemical resistance, i.e., resistance to the chemical attack of some substances that are part of the composition of the body or glassy ceramic cladding, such as for example silicates; availability; constant quality, particularly in terms of tinting strength and tint; and low cost.

Synthetic pigments are known which are obtained from the high-temperature reaction of various chemical products, which by mutually combining form a product that satisfies the necessary requirements.

Pigments constituted by natural minerals are also known, but they have the drawback of a variable and inconstant behavior, particularly in terms of thermal stability and constant quality (tinting strength and tint).

These last pigments include, for example, a natural mineral known as gres de Thiviers, which originates from a sedimentary rock that is present in particular in France near Limoges.

Gres de Thiviers is a sand-like detritus that contains iron in the form of partially hydrated oxide together with limited quantities of other minerals, including silicoaluminates, carbonates, phosphates and others.

Gres de Thiviers is extracted and subjected to a treatment during which the siliceous fraction, whose structure probably contains the iron oxide accumulated by precipitation during the formation of the sediment, is enriched.

The chemical analysis of gres de Thiviers is highly variable: on average, it contains $SiO_2$ in amounts variable from 78 to 86%, iron expressed as $Fe_2O_3$ in amounts variable from 11 to 15%, and impurities such as CaO, $Al_2O_3$, $P_2O_5$, and others.

In its natural state, gres de Thiviers has a more or less intense ochre yellow color, which bears witness to the fact that the iron oxide is present, at least to a large extent, in hydrated form, and assumes a coral pink color if it is subjected to a thermal cycle for firing at more than 850° C.

The use of gres de Thiviers as a pigment is known and widespread owing to the particular color tint of pink that it gives to ceramic and glass bodies and coatings; however, its use is limited by the inconstancy of its composition, by the variability of its behavior, particularly in terms of tint and coloring intensity, and by its very high cost.

Many attempts have been made to synthesize colors similar to gres de Thiviers, but all have had poor results; the synthesized pigments in fact produce a coloring that is closer to wine pink and brown than to coral pink, especially due to a significant quantity of iron oxide that is not inserted in the crystalline lattice of the silica and is still present as such in their structure.

SUMMARY OF THE INVENTION

The aim of the present invention is to eliminate the drawbacks noted above by providing a method for obtaining pigments for ceramic and glass, particularly for substrates and coatings, and the colors obtained thereby, allowing to obtain pigments that are thermally stable, have a controllable and presettable composition and a constant behavior in terms of tinting or coloring strength and tint and color can be produced easily industrially with low investments and costs.

This aim and these and other objects that will become better apparent hereinafter, are achieved, according to the present invention, by a method for obtaining pigments for ceramic and glass, particularly for substrates and coatings, characterized in that it comprises a step of adding a solution of at least one salt of a chromophorous element to at least one silicon addition agent selected from a group that consists of silicate solution and silica in gel form.

DETAILED DESCRIPTION OF THE INVENTION

The chromophorous element is selected from a group that consists of iron, copper, cobalt, chromium and manganese.

The silicate solution comprises at least one solute, selected from a group that consists of: alkaline metal silicates, alkaline earth metal silicates, and a solvent selected from a group that consists of water, alcohol, water-alcohol solution.

The alkaline metal silicates are selected from a group that consists of: lithium silicates, sodium silicates (sodium silicate $Na_2SiO_3$, sodium orthosilicate $Na_4SiO_4$), potassium silicates, in anhydrous or hydrated form, or mixtures thereof.

The alkaline earth metal silicates are selected from a group that consists of: calcium silicates, magnesium silicates, barium silicates, in anhydrous or hydrated form, or mixtures thereof.

The solution of a salt of a chromophorous element comprises at least one solvent selected from a group that consists of: water, alcohol, water-alcohol solution.

The salt of the chromophorous element is suitable to convert into oxide of the chromophorous element by thermal treatment at high temperature.

For the sake of simplicity in description, the method according to the invention is referred, by way of example, to the case in which the chromophorous element is iron.

The salt of the chromophorous element is therefore an iron salt, the iron being in divalent or trivalent form, which is suitable to be converted into iron oxide by thermal treatment at high temperature and in particular is suitable to convert into ferric oxide ($Fe_2O_3$).

The iron salt can be selected from a group that consists of: ferric nitrate, iron sulfate, mixed salt of iron ammonium sulfate, iron acetate, or others.

The silica in gel form ($SiO_2xH_2O$) is subjected beforehand to a step of dehydration by drying at temperatures close to 110° C. and is in powder or granular form.

In a first embodiment of the method according to the invention, referenced as a pure co-precipitation method, one proceeds with a step for mixing the solution of a salt of iron (or of chromophorous element) and of the solution of silicates and with a step of co-precipitation, from the mixture obtained in the preceding step, of at least one insoluble compound of silicon and at least one insoluble compound of iron (or of chromophorous element).

The silicate solution has a highly basic reaction; to make co-precipitation occur, at least one acid or a solution of an acid is added:

to the solution of the salt of iron (or of chromophorous element) before it is mixed with the silicate solution and/or to the silicate solution before it is mixed with the solution of the salt of iron (or of chromophorous element), and/or to the mixture of the solution of silicates and of the solution of the salt of iron (or of chromophorous element).

The acid can be selected from a group that consists of: hydrochloric acid, sulfuric acid, nitric acid, acetic acid, or mixtures thereof.

Once neutrality of the mixture (solution of silicates, solution of a salt of iron or of chromophorous element, acid and/or acid solution) has been reached, the combined precipitation of an insoluble compound of the silicon and of an insoluble compound of the iron (or of the chromophorous element) begins in dispersed form according to the agitation and concentration of the mixture, together with the soluble salts related to the acid used.

The precipitated insoluble silicon compound is suitable to be converted to silicon oxide by subsequent thermal treatment at high temperature: likewise, the precipitated insoluble compound of iron (or of the chromophorous element) is suitable to be converted into oxide of iron (or of the chromophorous element) by thermal treatment at high temperature and specifically into ferric oxide ($Fe_2O_3$).

The precipitated insoluble silicon compound is, for example, a silicon hydroxide; the insoluble iron compound is, for example, an iron hydroxide, the iron being in divalent (ferrous) or trivalent (ferric) form.

The mixture of the two precipitated insoluble compounds can be subjected to a washing step suitable to remove the salts of the acids formed during precipitation, and to a subsequent drying step; these steps can be omitted if the soluble salts are compatible with the use of the pigment.

The mixture of the two precipitated insoluble compounds, optionally washed and dried, can be subjected to a step of thermal treatment at high temperature, in the interval between 500 and 1300° C., which is the so-called calcining temperature and is suitable to convert the insoluble silicon compound into crystalline silica and the insoluble compound of iron (or of chromophorous element) into ferric oxide ($Fe_2O_3$) (or oxide of the chromophorous element), the ferric oxide being at least partially included in the crystalline structure of the silica.

In particular, the silica hydroxide dehydrates and is converted into crystalline silica, while the iron hydroxide dehydrates and becomes oxide.

During crystalline rearrangement, the iron present in divalent form is oxidized into trivalent form and is included in the crystalline structure of the silica.

It is noted that the calcining step can be omitted; in this case, the mixture of the precipitated insoluble compounds is used as color for ceramic articles; formation of the crystalline silica, oxidation of the iron from the divalent form to the trivalent form and its inclusion in the lattice of the silica will occur during the ordinary firing cycles to which ceramic articles are subjected and during which temperatures of 1100° C. or more are reached.

The mixture of the precipitated insoluble compounds of silicon and iron (or of chromophorous element) can also be subjected to dry or wet grinding, which can be performed before or after one of the washing, drying and calcining steps, if provided, and by using ordinary mills of the Alsing or jet type.

By adjusting the parameters of the process (dilutions, temperature, agitation of the solutions) it is possible to modify and control the composition of the final pigment.

In a second embodiment of the method according to the invention, referenced as the pure adsorption method, one proceeds with a step for mixing, by means of a known mixer, the solution of a salt of iron (or of chromophorous element) together with the silica in gel form and dried beforehand, until the solution of salt of iron (or of chromophorous element) is completely adsorbed by the silica in gel form, thus obtaining a paste. The iron salt in solution can be in divalent or trivalent form: advantageously, an iron salt in trivalent form such as a nitrated ferric salt is used: in any case, the iron salt used must allow formation of the ferric oxide ($Fe_2O_3$) during the subsequent high-temperature thermal treatment.

The resulting paste can be subjected to a step for drying and/or to a step for thermal treatment at high temperature, between 500 and 1300° C., known as calcining, which is suitable to convert the silica in gel form into crystalline silica and the salt of iron (or of the chromophorous element) of the solution adsorbed thereon into ferric oxide ($Fe_2O_3$) (or oxide of the chromophorous element), the ferric oxide being included at least partially in the crystalline structure of the silica.

The calcined product can be subjected to a washing step if the solution of the iron salt used contains other salts that are not decomposable or volatile at the calcining temperature.

Finally, the calcined paste is subjected to a step of dry or wet milling by using conventional mills of the Alsing or jet type, until a selected particle size distribution is achieved.

In a third embodiment of the method according to the invention, referenced as the mixed adsorption and co-precipitation method, one proceeds with a step for mixing the silica in gel form and the silicate solution to obtain a suspension, a step for mixing the resulting suspension and the solution of a salt of iron (or of chromophorous element), the solution of a salt of iron (or of chromophorous element) being partially adsorbed by the silica in gel form in suspension, and a step for the co-precipitation, from the mixture obtained in the preceding step, of at least one insoluble silicon compound and of at least one insoluble compound of iron (or of chromophorous element) in order to obtain the color in manners similar to those described in the pure co-precipitation method.

As an alternative, the mixed method can comprise a step of mixing the silica in gel form with the solution of a salt of iron (or of chromophorous element) in order to obtain a suspension, the solution of a salt of iron (or of chromophorous element) being partially adsorbed by the silica in gel form in suspension, a step for mixing the suspension and the solution of silicates, and a step for the co-precipitation, from the mixture obtained in the preceding step, of at least one insoluble compound of silicon and of at least one insoluble compound of iron (or of chromophorous element) in order to obtain the color in manners similar to those described in the pure co-precipitation method.

With the mixed method, one obtains a pigment that is partly constituted by silica in gel form, on which part of the solution of a salt of iron (or of chromophorous element) used is adsorbed, and partly constituted by the precipitated insoluble compounds of silicon and iron (or chromophorous element).

The pigment can optionally be subjected to steps of washing, drying, high-temperature thermal treatment and grinding, performed according to a suitable sequence that depends on the individual case.

Advantageously, the method according to the invention, be it the pure co-precipitation method or the pure or mixed adsorption method, can comprise a step for adding, to the solution a salt of iron (or of a chromophorous element) and/or to the solution of silicates and/or to the silica in gel form, at least one additive selected from a group that consists of: salts of phosphorus, salts of calcium, salts of boron, salts of aluminum, salts of barium, of the simple or complex type, in quantities not exceeding 10%.

These additives take part in the co-precipitation, adsorption and subsequent diffusion steps and can affect the reactivity of the final color, its tinting strength and its tint.

The method according to the invention, be it the pure co-precipitation method or the pure or mixed adsorption method, allows the ion of the chromophorous element (divalent or trivalent iron) to be adsorbed by the silica, which in the form of a gel or silicon hydroxide has a particular adsorption property.

The final pigment obtained with the method according to the invention comprises a binary composition of $SiO_2$, with a content that can vary from 50 to 95%, and of iron, with a content that can vary from 5 to 25%; the iron is present in the form of ferric oxide ($Fe_2O_3$) and is included in the crystalline structure of the silica.

The resulting pigment can be used in the ceramic industry and in the glass industry for ceramic mixtures, for glassy mixtures, for ceramic coatings and for glass coatings.

The examples that follow are given only as an illustration of the present invention and must not be understood as limiting its scope, which is defined in the appended claims.

EXAMPLE 1

Method of pure co-precipitation of $Si(OH)_4 \cdot xH_2O + Fe(OH)_2/Fe(OH)_3$ for obtaining a pigment for ceramic and glass, particularly for substrates and coatings, with an $SiO_2/Fe_2O_3$ ratio of 90/10.

The production of 100 g of product requires:
Anhydrous sodium silicate: 190 g
Iron as ferrous sulfate heptahydrate: 35 g The sodium silicate is dissolved in approximately 500 cc of water in agitation at 400 rpm to obtain the silicate solution.

The ferrous sulfate is dissolved in approximately 500 cc of water and 220 cc of 36% hydrochloric acid are added thereto until complete dissolution occurs together with a few drops of hydrogen peroxide in order to obtain an acid solution of iron salt.

The acid solution of the iron salt and the sodium silicate solution thus obtained are mixed, monitoring the pH during the addition of one to the other.

The overall solution exhibits incipient precipitation and the pH is still alkaline.

40 cc of 36% hydrochloric acid, diluted to 50% with water, are prepared and gradually added to the mixture obtained previously, monitoring the pH and stopping the addition at pH 7–7.5.

The system is left under agitation for 30 min, making sure that the pH remains constant and optionally correcting by adding more diluted hydrochloric acid.

At the end of the precipitation, the system is allowed to settle, is filtered, dried in an oven at 120° C. and then subjected to a step of thermal treatment for calcining at approximately 450–480° C. in order to destroy completely the amorphous structure of the precipitates.

Depending on its intended use, the product can be subjected to additional washing steps before being calcined further at 850–900° C.

A dry grinding step in Alsing mills or in jet mills to the selected fineness is performed.

EXAMPLE 2

Method of pure co-precipitation of $Si(OH)_4 \cdot xH_2O + Fe(OH)_2/Fe(OH)_3$ for obtaining a pigment for ceramic and glass, particularly for substrates and coatings, with an $SiO_2/Fe_2O_3$ ratio of 87/13.

The production of 100 g of product requires:
Commercial anhydrous sodium silicate: 185 g
Ferric chloride hexahydrate: 45 g The sodium silicate is dissolved in water and the ferric chloride is dissolved separately in water acidified with 150 cc of 36% hydrochloric acid.

As in example 1, 40 cc of 36% hydrochloric acid diluted to 50% with water are prepared and gradually added to the mixture obtained previously, monitoring the pH and stopping the addition at pH 7–7.5.

The system is left under agitation for 30 min, making sure that the pH remains constant, optionally correcting by adding more diluted hydrochloric acid.

Filtration is performed, the precipitates are subjected to a washing step and to a subsequent step for drying and thermal treatment at temperatures on the order of 450° C.

A further washing step is performed until the soluble salts are eliminated.

A thermal treatment for calcining at 850° C. is performed; finally, a grinding step is performed until the intended particle size is reached.

EXAMPLE 3

Method of pure co-precipitation of $Si(OH)_4 \cdot xH_2O + Fe(OH)_2/Fe(OH)_3$ for obtaining a pigment for ceramic and glass, particularly for substrates and coatings, with an $SiO_2/Fe_2O_3$ ratio of 86/10.

The production of 100 g of product requires:
Anhydrous sodium silicate: 180 g
Ferric nitrate solution equal to 10 g of $Fe_2O_3$: 150 cc
Calcium phosphate powder: 3 g
Sodium fluoride: 0.8 g The sodium silicate ($Na_2SiO_3$) is dissolved in 500 cc of water under agitation and the calcium phosphate and sodium fluoride are added to it in suspension.

The solution of ferric nitrate with 200 cc of water and 120 cc of nitric acid is prepared separately.

The solution of ferric nitrate is gradually mixed with the solution of silicate containing calcium phosphate and sodium fluoride; then the precipitation of the silica and the iron is completed by adding a solution of 1:2 nitric acid until the pH is 6.5–7.0.

As in examples 1 and 2, the steps for washing, drying, thermal treatment for calcining, and grinding are then performed.

The resulting pigment has a stronger tint that is slightly less coral-like than the product prepared according to example 1.

EXAMPLE 4

Method of pure adsorption of $Fe^{+3}$ on silica gel $Si(OH)_4 \cdot xH_2O$ to obtain a pigment for ceramic and glass, particularly for substrates and coatings.

The production of the product requires:
Silica gel powder ($SiO_2$ titer 98%): 93 g
Solution of $Fe(NO_3)_3$ equal to 10 g of $Fe_2O_3$: 80 cc A mixer is used to thoroughly mix the silica in gel form and the ferric nitrate solution until it has been absorbed fully by the silica in gel form.

The product is subjected to a step for thermal treatment at a temperature of 600° C.

The product is subjected to a grinding step with conventional mills in order to obtain the intended particle size.

In this case, no washing step is performed, since the thermal decomposition of the ferric nitrate leaves no residues in the final product.

EXAMPLE 5

Method of pure adsorption of $Fe^{+3}$ on silica gel $Si(OH)_4 \cdot xH_2O$ to obtain a pigment for ceramic and glass, particularly for substrates and coatings.

The production of the product requires:
Silica gel powder: 93 g
Solution of $Fe_2(SO_4)_3$ equal to 10 g of $Fe_2O_3$: 90 cc As in example 4, a mixer is used to mix the silica in gel form and the $Fe_2(SO_4)_3$ solution until it has been absorbed fully by the silica gel.

The product is subjected to a step for thermal treatment at a temperature of 600° C.

The product is subjected to a grinding step with conventional mills in order to obtain the intended particle size.

EXAMPLE 6

Mixed method of co-precipitation of $Si(OH)_4 \cdot xH_2O + Fe(OH)_2/Fe(OH)_3$ and of adsorption of $Fe^{+3}$ on silica gel $Si(OH)_4 \cdot xH_2O$ to obtain a pigment for ceramic and glass, particularly for substrates and coatings.

The production of the product requires:
Anhydrous sodium silicate: 85 g
Silica in gel form: 50 g
Ferric chloride hexahydrate: 50 g The sodium silicate is dissolved in 300 cc of demineralized water; the ferric chloride is dissolved separately in 200 cc of water and 100 cc of 36% hydrochloric acid to obtain an acid solution of an iron salt.

The silica gel is added to the silicate solution, obtaining a suspension to which the acid solution of ferric chloride is added; a first partial precipitation of the iron hydrate is thus obtained.

A solution of hydrochloric acid, diluted 1:1, is added while monitoring the pH until neutrality is reached.

After precipitation, the subsequent steps of washing, drying and thermal treatment for calcining at temperatures higher than 450° C. are performed.

Finally, a grinding step is performed until the intended particle size is reached.

EXAMPLE 7

Mixed method of co-precipitation of $Si(OH)_4 \cdot xH_2O + Fe(OH)_2/Fe(OH)_3$ and of adsorption of $Fe^{+3}$ on silica gel $Si(OH)_4 \cdot xH_2O$ to obtain a pigment for ceramic and glass, particularly for substrates and coatings.

The production of the product requires:
Silica gel in powder (98% $SiO_2$): 60 g
Anhydrous sodium silicate: 90 g
Solution of $Fe(NO_3)_3$ equal to 20 g of $Fe_2O_3$: 200 cc
Nitric acid: 100 cc In a 500 cc-container, under agitation at 300 rpm, the solution of ferric nitrate and the silica in gel form are combined; the gel adsorbs part of the solution of ferric nitrate until it is saturated.

The sodium silicate is separately dissolved in 150 cc of water, to which the 150 cc of nitric acid are added.

Since the silica in gel form has not adsorbed all the volume of solution, it still contains a liquid phase.

The partially acidified solution of sodium silicate is added to this suspension of silica in gel form, and neutralization (pH 6.5–7.0) is completed by adding a diluted solution of commercial nitric acid.

All the remaining iron thus precipitates to ferric hydrate together with the hydrated silica that originates from the sodium silicate.

Filtration is performed and the steps of washing, drying and thermal treatment for calcining at temperatures above 600° C. are performed.

Finally, a grinding step is performed until the intended particle size is reached.

In all of the examples given above, the sodium silicate can be replaced with other alkaline and/or alkaline earth silicates, naturally recalculating the quantities related to the $SiO_2$ titer and of the compounds required for precipitation according to the usual rules of chemical stoichiometry. In the same way, the alkali/silica ratio of the silicate can be between 0.8 and 2.8.

The disclosures in Italian Patent Application No. MO2001A000232 from which this application claims priority are incorporated herein by reference.

What is claimed is:

1. A method for obtaining pigments for substrates and coatings of ceramic and glass, comprising a step of adding a solution of an iron salt to at least one silicon addition agent comprising silica in gel form.

2. The method of claim 1, wherein said silicon addition agent further comprises a silicate solution.

3. The method of claim 1, further comprising a step of addition, to at least one among said solution of an iron salt, said silicate solution, and said silica in gel form, of at least one additive selected from the group consisting of phosphorus salts, calcium salts, boron salts, aluminum salts.

4. The method of claim 3, wherein said additives are added in quantities not exceeding 10%.

5. The method of claim 3, further comprising a step of mixing a solution of an iron salt and a solution of silicates, and a step for the co-precipitation, from a mixture obtained in the preceding step, of at least one insoluble compound of silicon and at least one insoluble compound of the the iron salt in order to obtain a pigment.

6. The method of claim 4, further comprising a step of mixing a solution of an iron salt together with silica in gel form, the solution of an iron salt being adsorbed by the silica in gel form in order to obtain a pigment.

7. The method of claim 5, further comprising a step of mixing silica in gel form with said silicate solution until a suspension is obtained, a step of mixing said suspension and said solution of an iron salt, the solution of an iron salt being partially adsorbed by the suspended silica in gel form, and a step of co-precipitation, from a mixture obtained in the preceding step, of at least one insoluble compound of silicon and at least one insoluble compound of the iron salt in order to obtain a pigment.

8. The method of claim 5, further comprising a step of mixing the silica in gel form to said solution of an iron salt until a suspension is obtained, the solution of an iron salt being partially adsorbed by the suspended silica in gel form, a step of mixing said suspension and said solution of silicates and a step of co-precipitation, from a mixture obtained in the preceding step, of at least one insoluble compound of silicon and at least one insoluble compound of the iron salt in order to obtain a pigment.

9. The method of claim 7, further comprising a step of adding to said solution of iron salt an acid suitable to promote said co-precipitation step.

10. The method of claim 8, further comprising a step of adding to said silicate solution an acid suitable to promote said co-precipitation step.

11. The method of claim 10, wherein said co-precipitation step comprises the addition of a solution of an acid to said mixture obtained in the preceding step.

12. The method of claim 11, wherein said acid is selected from the group consisting of hydrochloric acid, sulfuric acid, nitric acid and acetic acid.

13. The method of claim 10, wherein said solution of silicates comprises at least one solute selected from the group consisting of alkali metal silicate and alkali earth metal silicate.

14. The method of claim 13, wherein said alkaline metal silicates are selected from the group consisting of lithium silicate, sodium silicate and potassium silicate.

15. The method of claim 13, wherein said alkali earth metal silicate are selected from the group consisting of calcium silicate, magnesium silicate and barium silicate.

16. The method of claim 13, wherein said solution of silicates comprises at least one solvent selected from the group consisting of water, alcohol and water-alcohol solution.

17. The method of claim 13, wherein said solution of an iron salt comprises at least one solvent selected from the group consisting of water, alcohol and water-alcohol solution.

18. The method of claim 9, wherein said insoluble silicon compound is converted into silicon oxide by thermal treatment at a temperature between 500 and 1300° C.

19. The method of claim 9, wherein said insoluble silicon compound is a silicon hydroxide.

20. The method of claim 9, wherein said insoluble iron salt is converted into an iron oxide by thermal treatment at a temperature between 500 and 1300° C.

21. The method of claim 10, comprising a step of dehydration by drying of the silica in gel form that precedes said mixing steps.

22. The method of claim 21, wherein said iron salt, in which iron is in divalent or trivalent form, is convened into iron oxide by thermal treatment at a temperature between 500 and 1300° C.

23. The method of claim 22, wherein said iron salt is selected from the group consisting of ferric nitrate, iron sulfate, mixed salt of iron ammonium sulfate and iron acetate.

24. The method of claim 22, wherein said insoluble iron salt is an insoluble iron compound that is converted into iron oxide by thermal treatment at a temperature between 500 and 1300° C.

25. The method of claim 24, wherein said insoluble iron compound is an iron hydroxide, iron being in divalent or trivalent form.

26. The method of claim 24 wherein said iron oxide is ferric oxide.

27. The method of claim 21, comprising at least one step of washing said pigment.

28. The method of claim 27, comprising a step of thermal treatment at a temperature between 500 and 1300° C. of said pigment.

29. The method of claim 28, wherein said step of thermal treatment converts said insoluble silicon compound into crystalline silica and said insoluble iron compound into an iron oxide, said iron oxide being at least partially included in the crystalline structure of the silica.

30. The method of claim 28, wherein said step of thermal treatment converts said silica that is present in the form of gel into crystalline silica and said iron salt of the solution adsorbed thereon into an iron oxide, said iron oxide being at least partially included in the crystalline structure of the silica.

31. The method of claim 28, wherein said step of thermal treatment converts said insoluble compound of silicon into crystalline silica and said insoluble compound of iron into ferric oxide, said ferric oxide being included at least partially in the crystalline structure of the silica.

32. The method of claim 28, wherein said step of thermal treatment converts said silica that is present in form of gel into crystalline silica and said iron salt of the solution adsorbed thereon into ferric oxide ($Fe_2O_3$), said ferric oxide being at least partially included in the crystalline structure of the silica.

33. The method of claim 28, further comprising a step of grinding said pigment.

34. A pigment for substrates and coatings of ceramic and glass, obtained with a method as set forth in claim 1, by mixing a solution of an iron salt to at least one silicon addition agent comprising silica in gel form.

35. The pigment of claim 34, wherein said silicon addition agent further comprises a silicate solution.

36. The pigment of claim 34, comprising a binary composition of $SiO_2$ in an amount that varies between 50 and 95% and of iron oxide in an amount that varies between 5 and 25%.

37. The pigment of claim 36, wherein said iron oxide is present in the form of ferric.

38. A process in which a pigment as set forth in claim 34 is used for obtaining any of a ceramic mix, glass mix, ceramic coating or glass coating.

* * * * *